(12) United States Patent
Bonneau

(10) Patent No.: US 8,883,116 B2
(45) Date of Patent: Nov. 11, 2014

(54) ALUMINA, LUMINOPHORES AND MIXED COMPOUNDS, AND ASSOCIATED PREPARATION PROCESSES

(75) Inventor: Lionel Bonneau, Cran Gevrier (FR)

(73) Assignee: Baikowski, Poisy (FR)

( * ) Notice: Subject to any disclaimer, the term of this patent is extended or adjusted under 35 U.S.C. 154(b) by 224 days.

(21) Appl. No.: 13/257,489

(22) PCT Filed: Mar. 18, 2010

(86) PCT No.: PCT/EP2010/053500
§ 371 (c)(1),
(2), (4) Date: Sep. 19, 2011

(87) PCT Pub. No.: WO2010/106122
PCT Pub. Date: Sep. 23, 2010

(65) Prior Publication Data
US 2012/0012791 A1  Jan. 19, 2012

(30) Foreign Application Priority Data
Mar. 20, 2009  (FR) ..................... 09 01317

(51) Int. Cl.
C01F 7/00 (2006.01)
C09K 11/77 (2006.01)
C09K 11/02 (2006.01)
C09K 11/57 (2006.01)
H01J 61/44 (2006.01)

(52) U.S. Cl.
CPC ............ *C01F 7/002* (2013.01); *C09K 11/7792* (2013.01); *C09K 11/02* (2013.01); *C01P 2004/03* (2013.01); *C01P 2002/72* (2013.01); *C09K 11/574* (2013.01); *C09K 11/576* (2013.01); *C01P 2004/61* (2013.01); *C09K 11/7734* (2013.01); *C09K 11/7774* (2013.01); *C01P 2004/50* (2013.01); *C01P 2004/62* (2013.01); *H01J 61/44* (2013.01)
USPC ........................................ 423/625

(58) Field of Classification Search
USPC ............................ 423/625; 501/127; 313/635
See application file for complete search history.

(56) References Cited

U.S. PATENT DOCUMENTS 3,855,172 A * 12/1974 Iler et al. ............... 523/223
4,026,816 A    5/1977 Ranby et al.
4,818,515 A *  4/1989 Ceresa et al. .......... 423/625
5,838,100 A * 11/1998 Jansma ................... 313/485
2005/0248276 A1 11/2005 Nomura et al.
2006/0022580 A1  2/2006 Jermann et al.

FOREIGN PATENT DOCUMENTS

EP    0 250 616 A1   1/1988
EP    0 769 802 A2   4/1997
JP    61-132513     11/1984
WO    WO 03/059819 A1  7/2003

OTHER PUBLICATIONS

Dynys, et al., "Alpha alumina formation in alum-derived gamma alumina" J. American Ceramic Soc., vol. 65, No. 9, pp. 442-448, Dec. 1982.*

Chiang, et al.; "Synthesis of YAG:Ce phosphor via different aluminum sources and precipitation processes;" Journal of Alloys and Compounds; vol. 416; 2006; pp. 265-269.

Koruderlieva, et al.; "Influence of Inorganic Additives on the Modification Conversion $\gamma \rightarrow \alpha\text{-}Al_2O_3$;" Interceram; vol. 41; No. 7/8; 1992; pp. 468-469.

PCT Search Report of the ISA for PCT/EP2010/053500 dated Jun. 15, 2011.

* cited by examiner

*Primary Examiner* — Steven Bos
(74) *Attorney, Agent, or Firm* — Daly, Crowley, Mofford & Durkee, LLP

(57) ABSTRACT

The present invention relates to the synthesis of luminophores and of reflective alumina for optimizing the emissive properties of a fluorescent layer.

6 Claims, 4 Drawing Sheets

ALUMINA, LUMINOPHORES AND MIXED COMPOUNDS, AND ASSOCIATED PREPARATION PROCESSES

CROSS REFERENCE TO RELATED APPLICATIONS

Figure 1:
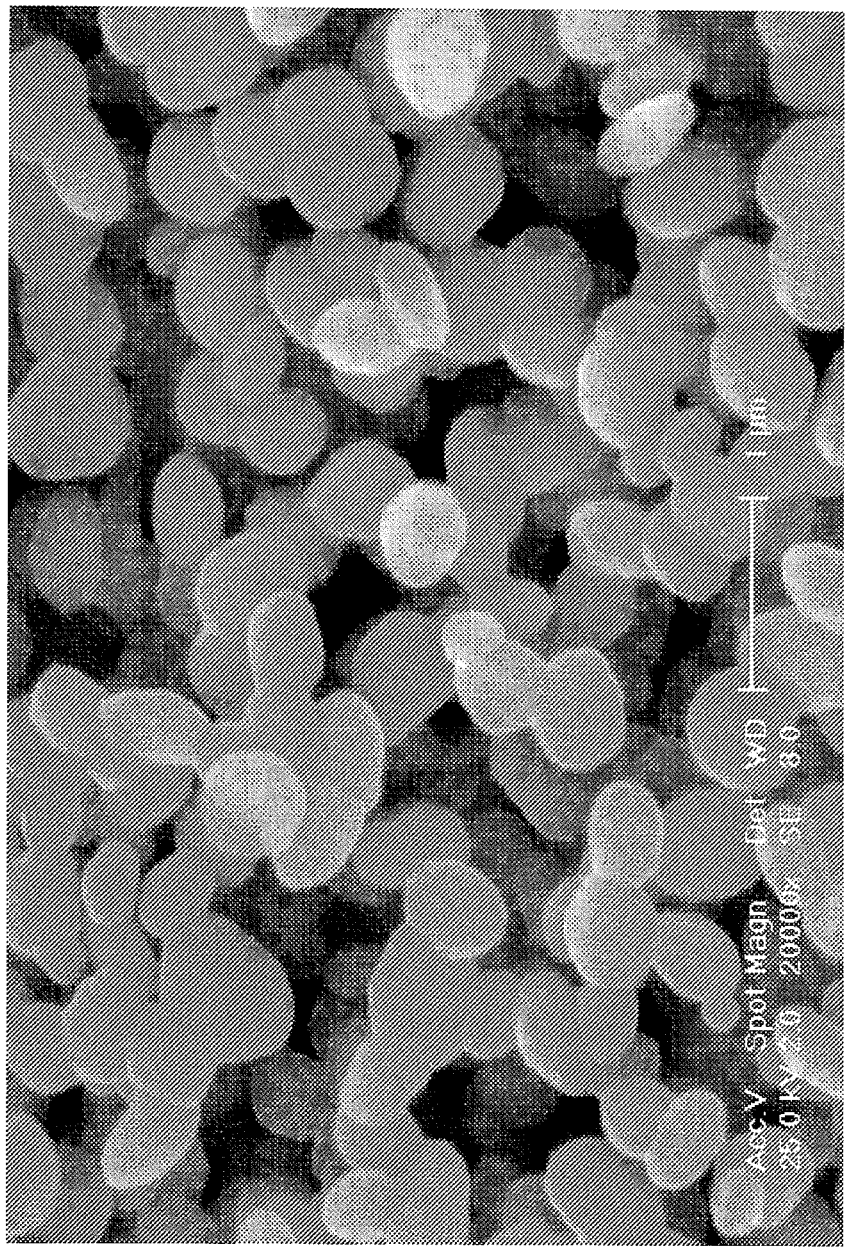

This application is a National Stage application of PCT/EP2010/053500 filed on Mar. 18, 2010, and published in the French language and entitled "ALUMINA, LUMINOPHORES AND MIXED COMPOUNDS, AND ASSOCIATED PREPARATION PROCESSES," and which claims priority to French application FR0901317 filed on Mar. 20, 2009.

The present invention lies in the field of aluminates and luminophores and the preparation thereof, and also fluorescent coatings, in particular for the manufacture of display screens, lighting, projectors, in particular plasma screens or field-emission screens, backlight lamps for liquid-crystal screens, light-emitting diodes, plasma-excitation light bulbs and trichromatic bulbs.

A fluorescent tube is made in its conventional form from a hermetically sealed glass tube filled with low-pressure mercury vapour and with a rare gas such as neon, argon or krypton. Electrodes inside the tube, when in operation, emit electrons that excite the gas mixture inside the tube and lead to emissions in the ultraviolet range (for example at about 300 nm).

This ultraviolet light is converted into visible light by means of a fluorescent coating deposited on the inside of the tube.

In the case of a "monolayer" coating, the coating comprises luminophore particles, known, for example, under the names BAM, CAT or YOx, and also alumina particles that act as reflectors.

Generally, 80% of this layer is composed of luminophore particles and 20% of particles of alumina or of alumina of gamma type.

The luminophore particles generally have a size $d_{50}$ of between 4 µm and 10 µm.

Now, it is known that the cost of luminophores is predominant in the overall cost of the coating.

In a thesis defended on 17 Oct. 2008 in the University of Paris 6 by Serge Itjoko, a study was undertaken firstly to model the behaviour of fluorescent layers and secondly to identify optimization routes in terms of yield and cost. This thesis is cited by reference in the present patent application as a prior art.

It emerges in particular from this study of a mixed layer or monolayer that an optimization may be achieved by "selecting luminophore radii that are much smaller than those of the existing luminophores, i.e. radii of between 0.4 µm and 1.2 µm, and radii of alumina grains that are much larger than those of the existing alumina grains, i.e. radii of greater than 0.6 µm".

This study gives merely a theoretical result, given that it is a theoretical modelling study, but gives no indication how such luminophores and alumina particles may be obtained. In particular, on page 173 of this thesis, it is stated that "commercial luminophores have a radius ranging between 3 µm and 6 µm" and that luminophores with a smaller size than this have not yet been developed.

One object of the present invention is to overcome the drawbacks of the known coatings and to propose formulations and preparation processes for achieving the theoretical objectives of the abovementioned study.

In particular, one subject of the invention is an alpha alumina composed essentially of particles with a size $d_{50}$ of between 0.3 µm and 2 µm and a substantially spherical shape.

A subject of the invention is also the use of an alpha alumina composed essentially of particles with a size $d_{50}$ of between 0.3 µm and 2 µm and a substantially spherical shape as a matrix for a luminophore.

According to another aspect, the subject is the use of an alpha alumina composed essentially of particles with a size $d_{50}$ of between 0.3 µm and 2 µm and a substantially spherical shape as a matrix for a luminophore in a coating for fluorescent lamps.

A subject of the invention is also a process for preparing an alumina of alpha type composed essentially of particles with a size $d_{50}$ of between 0.3 µm and 2 µm and a substantially spherical shape, comprising the following operations:
  gamma alumina obtained via the alum route is mixed with a sintering agent and alpha alumina seeds,
  the mixture is calcined in an oven at a temperature of between 1150° C. and 1400° C., especially 1350° C., for a time of between 1 hour and 6 hours, especially 2 hours,
  the calcined mixture is ground,
  the ground mixture is passed through a grille made of non-contaminating material with a mesh size of between 150 µm and 250 µm, especially 200 µm.

The invention may comprise one or more of the following characteristics, taken alone or in combination:

According to one aspect of the invention, the sintering agent is $NH_4F$.

According to another aspect of the invention, the mixture is composed, in weight proportions, of 85% to 95% gamma alumina obtained via the alum route, of 2.5% to 13% of alpha alumina and of 0.4% to 1.8% of $NH_4F$.

According to yet another aspect of the invention, the mixture is composed, in weight proportions, of about 93.5% gamma alumina obtained via the alum route, of about 5.5% alpha alumina and of about 1% $NH_4F$.

According to another aspect of the invention, the calcined mixture is ground in a ball mill with alumina milling beads at least twenty times greater in amount than the calcined mixture, for 16 hours.

According to one particular aspect, the alumina milling beads have a diameter of about a centimetre, especially between 3 cm and 5 cm.

A subject of the invention is also an aluminate luminophore in the form of aggregates with a mean size of about 10 µm, these aggregates being composed of particles with a mean size of between 0.25 µm and 1.5 µm.

According to another aspect of the invention, the luminophore is an aluminate in the form of a composition corresponding to the formula:

$$a(M^1O).b(MgO).c(Al_2O_3) \quad (1)$$

$$\text{or } a(M^2O_{1.5}).b(MgO).c(Al_2O_3) \quad (2)$$

in which $M^1$ denotes at least one alkaline-earth metal, $M^2$ denotes yttrium or cerium and terbium in combination, and a, b and c are integers or non-integers that satisfy the relationships: $0.25 \leq a \leq 4$; $0 \leq b \leq 2$ and $0.5 \leq c \leq 9$; in that $M^1$ and $M^2$ are partially substituted with europium and at least one other element belonging to the group of rare-earth metals, more particularly neodymium, terbium, cerium, dysprosium and gadolinium. The magnesium may be partially replaceable with Zn, Mn or Co, and the aluminium may be partially replaceable with Ga, Sc, B, Ge and Si.

According to another aspect of the invention, the luminophore is chosen from the group comprising $(Ce_{0.6}Tb_{0.4})$ $MgAl_{11}O_{19}$; $(Ba_{0.9}Eu_{0.1})MgAl_{10}O_{17}$; $Y_3Al_5O_{12}:Eu^{2+}$; $Y_3Al_5O_{12}:Ce^{3+}$; $Y_2O_3:Eu^{3+}$; $SrAl_{12}O_{19}:Mn^{2+}$; $Zn_2SiO_4:Mn^{2+}$.

According to yet another aspect of the invention, the luminophore is of the BAM, CAT, YAG or YOx type.

A subject of the invention is also a process for preparing via the alum route an aluminate luminophore as defined above in the form of aggregates with a mean size of about 10 μm, these aggregates being composed of particles with a mean size of between 0.25 and 1.5 μm, comprising the following operations:
- ammonium alum is mixed with at least one additive based on a rare-earth metal,
- this mixture is calcined at a first temperature of between 1100° C. and 1200° C., in particular 1150° C., for a time of between 1 hour and 2 hours, in particular 1 hour 30 minutes,
- the calcined mixture is passed through a grille made of non-contaminating material with a mesh size of between 150 μm and 250 μm, especially 200 μm,
- the calcined mixture is ground and passed through the screen,
- the ground mixture is passed through a grille made of non-contaminating material with a mesh size of between 150 μm and 250 μm, especially 200 μm,
- this ground and screened mixture is calcined at a second temperature of between 1300° C. and 1400° C., in particular 1350° C., for a time of between 3 hours and 5 hours, in particular 4 hours,
- the calcined mixture is ground,
- the ground mixture is passed through a grille made of non-contaminating material with a mesh size of between 150 μm and 250 μm, especially 200 μm.

According to another aspect, a magnesium sulfate heptahydrate is added to the mixture of the ammonium alum-additive based on a rare-earth metal.

According to another aspect, a final step of reduction with a gas containing hydrogen, with a temperature rise of between 10° C.-20° C./minute, especially 14° C./minute, and a steady stage of at least 1 hour at a temperature of between 1500° C. and 1600° C. at a pressure of about 100 mbar, is added.

According to yet another aspect, the additive based on a rare-earth metal is a rare-earth metal nitrate $M^3(NO_3)_3$, $M^3$ being a rare-earth metal taken from the group formed by lanthanum, cerium, praseodymium, neodymium, promethium, samarium, europium, gadolinium, terbium, dysprosium, holmium, erbium, thulium, ytterbium, lutetium, yttrium and scandium.

According to another aspect for the preparation of BAN, anhydrous barium sulfate ground to $d_{50}<1$ μm is added to the mixture comprising the ammonium alum, the additive based on a rare-earth metal and the magnesium sulfate heptahydrate.

A subject of the invention is also a process for preparing, via the alumina impregnation route, an aluminate luminophore as defined above in the form of aggregates with a mean size of about 10 μm, these aggregates being composed of particles with a mean size of between 0.25 and 1.5 μm, comprising the following operations:
- gamma alumina heated with a first solution heated to between 80° C. and 95° C., especially 90° C., is impregnated a first time with at least one additive based on a rare-earth metal,
- the impregnated gamma alumina is subjected to a first denitration heat treatment by heating to a first temperature of between 500° C. and 700° C., in particular 600° C., for a time of between 2 hours and 4 hours, in particular 3 hours,
- the result is passed through a grille made of non-contaminating material with a mesh size ≤500 μm,
- the impregnated, denitrated and screened alumina is ground,
- the ground mixture is passed through a grille made of non-contaminating material with a mesh size of between 150 μm and 250 μm, especially 200 μm,
- this ground and screened mixture is calcined at a temperature of between 1300° C. and 1400° C., in particular 1350° C., for a time of between 3 hours and 5 hours, in particular 4 hours,
- the result is ground,
- the result is passed through a grille made of non-contaminating material with a mesh size of between 150 μm and 250 μm, especially 200 μm.

According to a further aspect, after the first impregnation and the first denitration treatment:
- the alumina impregnated and denitrated with a second solution heated to between 80° C. and 95° C., especially 90° C., is impregnated a second time with at least one additive based on a rare-earth metal,
- the impregnated gamma alumina is subjected to a second denitration heat treatment by heating to a first temperature of between 500° C. and 700° C., in particular 600° C., for a time of between 2 hours and 4 hours, in particular 3 hours.

According to yet another aspect, a final step of reduction with a gas containing hydrogen, with a temperature rise of between 10° C.-20° C./minute, especially 14° C./minute, and a steady stage of at least 1 hour at a temperature of between 1500° C. and 1600° C. at a pressure of about 100 mbar, is added.

According to another aspect, the additive based on a rare-earth metal is a rare-earth metal nitrate $M^3(NO_3)_3$, $M^3$ being a rare-earth metal taken from the group formed by lanthanum, cerium, praseodymium, neodymium, promethium, samarium, europium, gadolinium, terbium, dysprosium, holmium, erbium, thulium, ytterbium, lutetium, yttrium and scandium.

For the preparation of the BAM, barium nitrate is added to the mixture comprising ammonium alum, the additive based on a rare-earth metal and the magnesium sulfate heptahydrate.

According to yet another aspect, the alumina is preheated to a temperature of between 80° C. and 150° C., especially 120° C., for a time of between 10 minutes and 2 hours.

As a variant, a subject of the invention is also a process for preparing via the impregnation route an aluminate luminophore as defined above in the form of aggregates with a mean size of about 10 μm, these aggregates being composed of particles with a mean size of between 0.25 and 1.5 μm, comprising the following operations:
- an alumina spinel heated with a first solution heated to between 80° C. and 95° C., especially 90° C., is impregnated with at least one additive based on a rare-earth metal,
- the impregnated alumina spinel is dried at a temperature of between 100° C. and 150° C., especially 120° C., for a time of between 3 hours and 5 hours, especially 4 hours,
- the dried result is passed through a grille made of non-contaminating material with a mesh size ≤500 μm,
- the impregnated alumina spinel is subjected to a denitration heat treatment by heating to a first temperature of between 500° C. and 700° C., in particular 600° C., for a time of between 2 hours and 4 hours, in particular 3 hours, the impregnated and denitrated alumina spinel is ground, the ground mixture is passed through a grille made of non-contaminating material with a mesh size of between 150 μm and 250 μm, especially 200 μm, this ground and screened mixture is calcined at a temperature of between 1300° C. and 1400° C., in particular 1350° C., for a time of between 3 hours and 5 hours, in particular 4 hours, the result is ground, the ground result is passed through a grille made of non-contaminating material with a mesh size of between 150 μm and 250 μm, especially 200 μm.

According to yet another aspect, for the preparation of the BAM, barium nitrate is added to the mixture comprising the alumina spinel-additive based on a rare-earth metal.

According to yet another aspect, a final step of reduction with a gas containing hydrogen, with a temperature rise of between 10° C.-20° C./minute, especially 14° C./minute, and a steady stage of at least 1 hour at a temperature of between 1500° C. and 1600° C. at a pressure of about 100 mbar, is added.

According to yet another aspect, the additive based on a rare-earth metal is a rare-earth metal nitrate $M^3(NO_3)_3$, $M^3$ being a rare-earth metal taken from the group formed by lanthanum, cerium, praseodymium, neodymium, promethium, samarium, europium, gadolinium, terbium, dysprosium, holmium, erbium, thulium, ytterbium, lutetium, yttrium and scandium.

According to yet another aspect, the alumina spinel is preheated to a temperature of between 80° C. and 150° C., especially 120° C., for a time of between 10 minutes and 2 hours.

A subject of the invention is also the use of a luminophore as defined above in the manufacture of display screens, lighting, projectors, in particular plasma screens or field-emission screens, backlight lamps for liquid-crystal screens, light-emitting diodes, plasma-excitation light bulbs and trichromatic bulbs.

A subject of the invention is also an alumina-luminophore mixed compound comprising between 50% and 95% of alpha alumina composed essentially of particles with a size $d_{50}$ of between 0.3 μm and 2 μm and a spherical shape as defined above and between 5% and 50% of a luminophore.

According to one aspect of this mixed compound, the luminophore is a luminophore as defined above.

According to another aspect, the luminophore is an aluminate in the form of a composition corresponding to the formula:

$$a(M^1O).b(MgO).c(Al_2O_3) \quad (1)$$

$$\text{or } a(M^2O_{1.5}).b(MgO).c(Al_2O_3) \quad (2)$$

in which $M^1$ denotes at least one alkaline-earth metal, $M^2$ denotes yttrium or cerium and terbium in combination, and a, b and c are integers or non-integers that satisfy the relationships: $0.25 \leq a \leq 4$; $0 \leq b \leq 2$ and $0.5 \leq c \leq 9$; in that $M^1$ and $M^2$ are partially substituted with europium and at least one other element belonging to the group of rare-earth metals, more particularly neodymium, terbium, cerium, dysprosium and gadolinium. The magnesium may be partially replaceable with Zn, Mn or Co, and the aluminium may be partially replaceable with Ga, Sc, B, Ge and Si.

According to another aspect of the invention, the luminophore is chosen from the group comprising $(Ce_{0.6}Tb_{0.4})MgAl_{11}O_{19}$; $(Ba_{0.9}Eu_{0.1})MgAl_{10}O_{17}$; $Y_3Al_5O_{12}:Eu^{2+}$; $Y_3Al_5O_{12}:Ce^{3+}$; $Y_2O_3:Eu^{3+}$; $SrAl_{12}O_{19}:Mn^{2+}$; $Zn_2SiO_4:Mn^{2+}$.

A subject of the invention is also a process for preparing a mixed compound as defined above, in which:

between 50% and 95% of alpha alumina composed essentially of particles with a size $d_{50}$ of between 0.3 μm and 2 μm and a substantially spherical shape and between 5% and 50% of a luminophore are mixed together;

the mixture is ground.

A subject of the invention is also the use of the compound as defined above in the manufacture of display screens, lighting, projectors, in particular plasma screens or field-emission screens, backlight lamps for liquid-crystal screens, light-emitting diodes, plasma-excitation light bulbs and trichromatic bulbs.

A subject of the invention is also an aqueous suspension for producing a coating for fluorescent lamps, especially fluorescent tubes comprising at least one mixed compound as defined above, polyethylene oxide, gamma alumina obtained from the alum route and demineralized water.

According to one aspect of the aqueous suspension, the weight proportions are:

25% to 50% of at least one mixed compound as defined above, 0.5% to 5% of polyethylene oxide, 0.3% to 1.5% of gamma alumina obtained from the alum route, and the remainder being demineralized water.

According to another aspect of the aqueous suspension, it comprises three mixed compounds forming a trichromatic assembly.

According to another aspect of the aqueous suspension, the three mixed compounds are present in weight proportions of:

between 35% and 40%, preferably 38%, of mixed compound $(Ce_{0.6}Tb_{0.4})MgAl_{11}O_{19}$-alpha alumina composed essentially of particles with a size $d_{50}$ of between 0.3 μm and 2 μm and a spherical shape;

between 10% and 15%, preferably 12%, of mixed compound $(Ba_{0.9}Eu_{0.1})MgAl_{10}O_{17}$-alpha alumina composed essentially of particles with a size $d_{50}$ of between 0.3 μm and 2 μm and a spherical shape;

and the remainder being the mixed compound $Y_2O_3:Eu^{3+}$-alpha alumina composed essentially of particles with a size $d_{50}$ of between 0.3 μm and 2 μm and a spherical shape.

Figure 2:
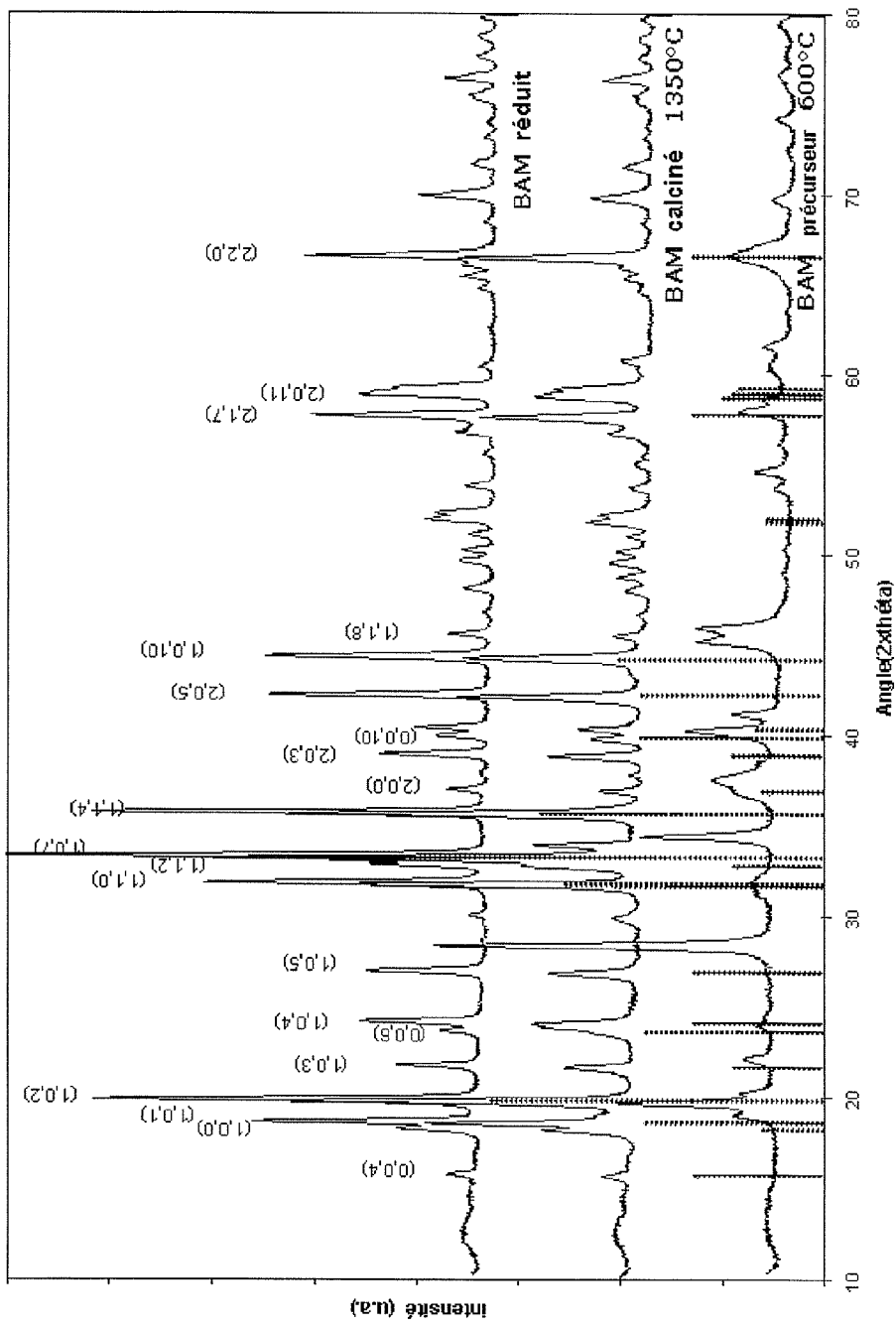
Figure 3:
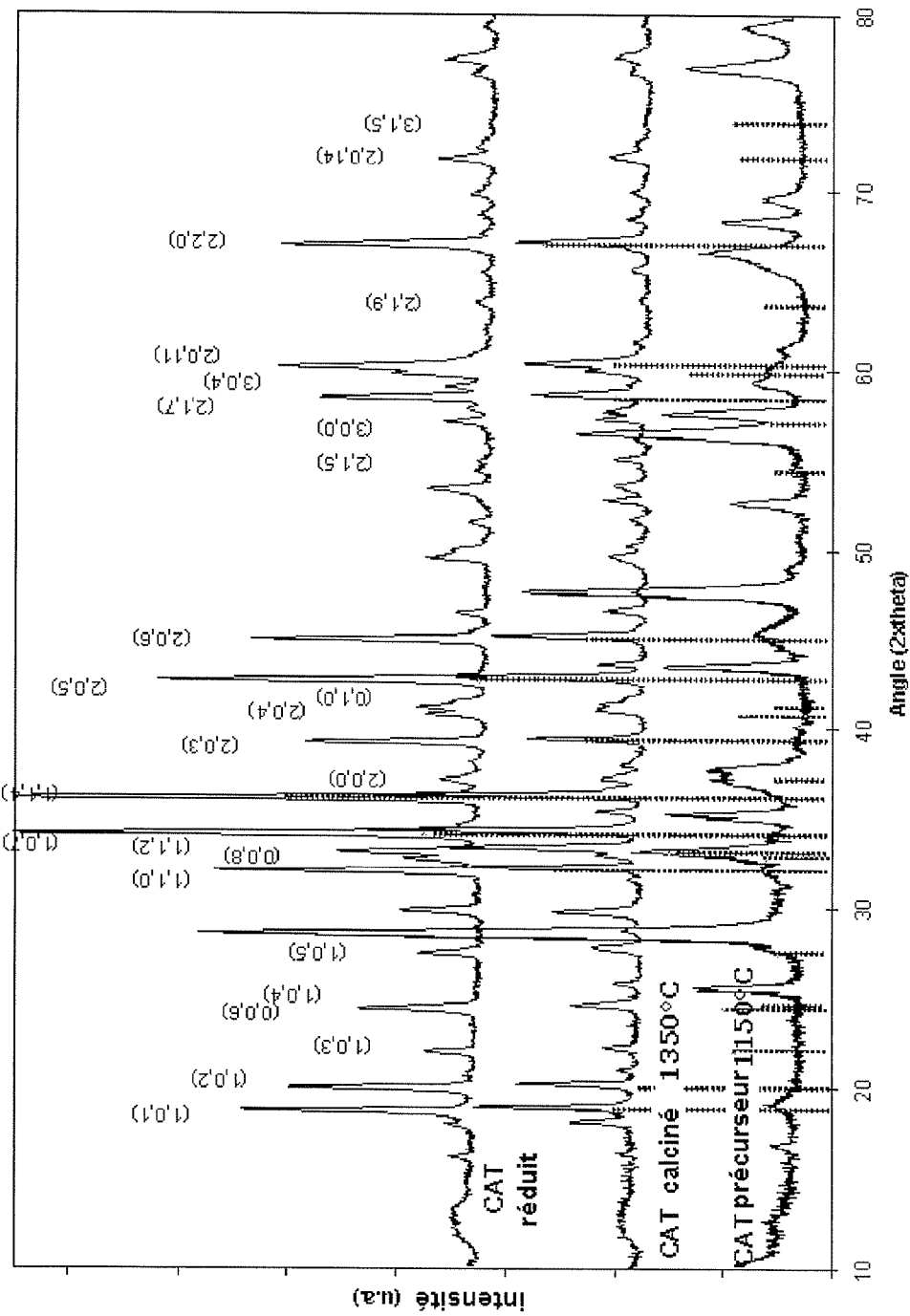
Figure 4:
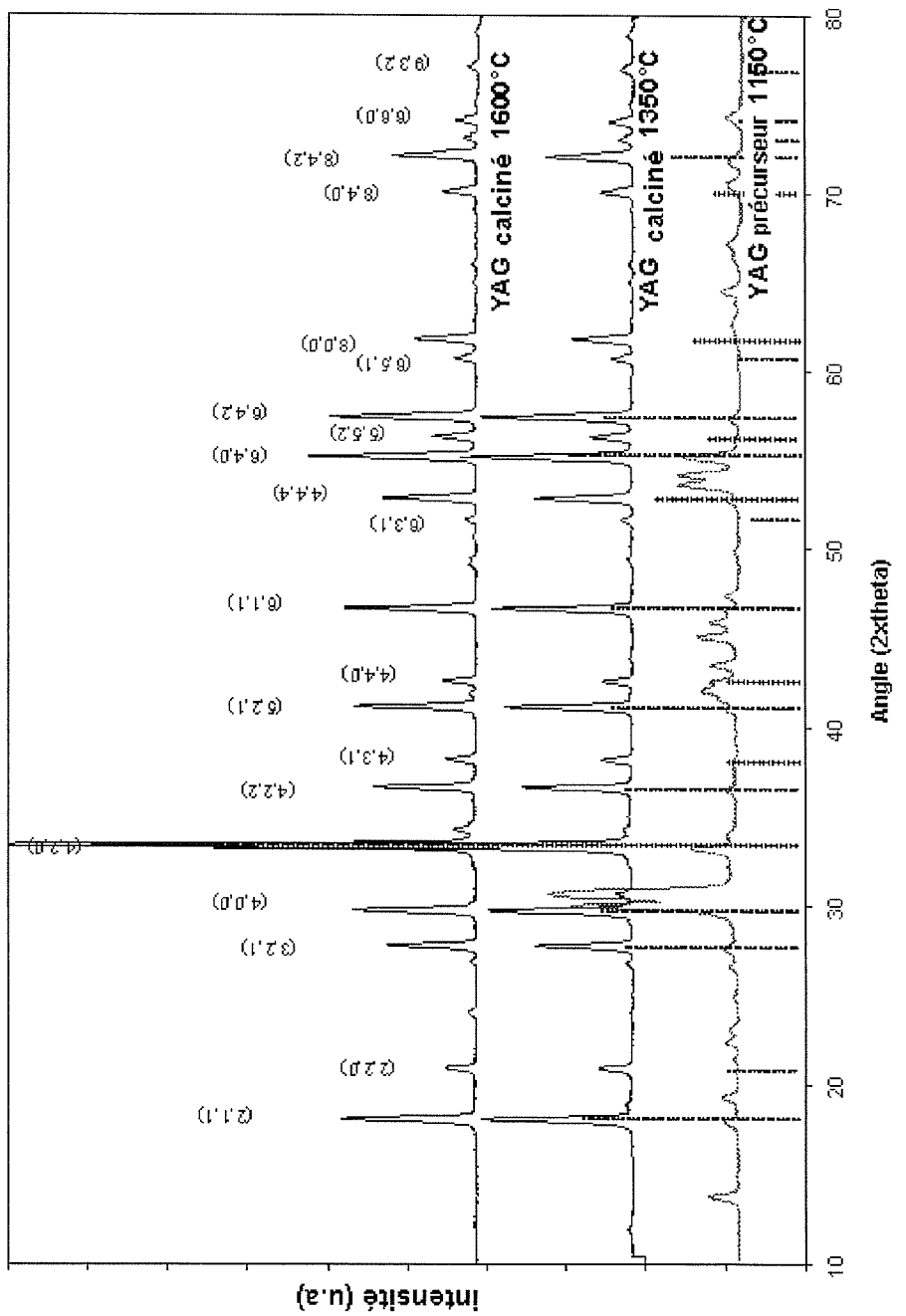

Other characteristics and advantages of the invention will emerge from the following description, which is given by way of example, with no limiting nature, with regard to the attached figures, in which:

FIG. 1 is an electron microscope photograph of an alpha alumina composed essentially of particles with a size $d_{50}$ of between 0.3 μm and 2 μm and a substantially spherical shape, FIG. 2 shows several diffraction spectra during the manufacture of a BAN, FIG. 3 shows several diffraction spectra during the manufacture of a CAT, and FIG. 4 shows several diffraction spectra during the manufacture of a YAG.

General Comments

For all the grinding operations, a unit amount is treated in a ball mill (for example a Sweco® brand batch mill of DM1 type) with alumina milling beads. The amount of alumina beads is at least ten times greater than the unit amount. In general, an amount of alumina milling beads 20 times greater than the unit amount to be treated was adopted to limit the milling time and to optimize the screening time.

For the screening operations, a screen made of a non-contaminating material, for example of plastic, especially of polyamide, was chosen to avoid any contamination of the undersize. For example, the term "200 μm screen or grille" means a screen whose screening mesh has an undersize of 200 μm.

For the calcination operations, a gas-fired tunnel oven whose maximum temperature is 1200° C. and whose residence time is variable between 1 hour and 3 hours and a gas-fired batch oven whose maximum temperature is 1400° C. and whose residence time is adaptable are used.

The spectral measurements were performed with an X-ray diffractometer: Rigaku®—model D/Max2200

The photograph of the alpha alumina was taken with an electron microscope: Philips®—series XL—model XL30.

The particle size measurements were taken either using a Micromeritics® brand Sedigraph granulometer type 5100 series 809, or with a Horiba® brand laser-scattering granulometer type LA920.

1. Alpha Alumina

One subject of the invention is an alpha alumina with a size $d_{50}$ of between 0.3 μm and 2 μm and a substantially spherical shape.

The diameter $d_{50}$ is defined as being the particle diameter for which 50% of the volume of the population is formed from particles with a diameter smaller than this value.

Such an alumina is shown in FIG. 1 as an electron microscope photograph. It is seen therein that these particles have a substantially spherical or ellipsoid shape, i.e. there are virtually no edges.

Such alpha alumina particles are particularly suitable for use as matrix for luminophores, especially in a coating, for example an alumina-luminophore monolayer for fluorescent lamps.

Specifically, it turns out that, in fluorescent lamps, such alumina particles have increased efficacy as reflectors of the ultraviolet light derived from excitation of the gas mixture by the electrodes and allow this ultraviolet light to be coupled more efficiently to the luminophore particles.

This novel alumina with better properties in terms of reflection and of coupling of light in luminophores is made, for example, according to the following preparation process:

According to a first step, gamma alumina obtained via the alum route, a sintering agent and alpha alumina seeds are mixed together. The sintering agent is, for example, $NH_4F$.

For this process, the term "gamma alumina obtained via the alum route" means an alumina whose crystal structure is predominantly composed of gamma alumina, especially to more than 80% or even 90% of gamma alumina.

For this process, the term "alpha alumina seeds" means pure seeds of alpha alumina or predominantly composed of alpha alumina, especially to more than 80% or even 90% of alpha alumina.

The mixture is, for example, composed, as weight proportions, of 85% to 95% gamma alumina obtained via the alum route, 2.5% to 13% alpha alumina and 0.4% to 1.8% $NH_4F$, more specifically, the mixture is composed, as weight proportions, of about 93.5% gamma alumina obtained via the alum route, of about 5.5% alpha alumina and of about 1% $NH_4F$.

Next, according to a second step, the mixture is calcined in an oven at a temperature of between 1150° C. and 1400° C., especially 1350° C., for a time of between 1 hour and 6 hours, especially 2 hours.

During a third step, the calcined mixture is ground, for example in a ball mill with alumina milling beads at least ten times greater in amount than the calcined mixture, for a time of between 8 hours and 30 hours, especially 16 hours.

More specifically, the calcined mixture can be ground in a ball mill with alumina milling beads at least twenty times greater in amount than the calcined mixture, for 16 hours.

In a fourth step, the ground mixture is passed through a grille made of a non-contaminating material, for example plastic, preferably polyamide, with a mesh size of between 150 μm and 250 μm, especially 200 μm.

EXAMPLE 1

To obtain about 1 kg of alpha alumina composed essentially of particles with a size $d_{50}$ of between 0.3 μm and 2 μm and a substantially spherical shape, 1000 g of gamma alumina sold under the name Baikalox® B105, 60 g of alpha alumina sold under the name Baikalox® BMA15 and 10 g of $NH_4F$ were mixed together.

The alumina BMA15 has the particular feature in that its crystal structure is 100% composed of alpha alumina with a diameter $d_{50}$ of about 150 nm.

In a second step, this mixture was then calcined at a temperature of 1350° C. for 2 hours.

In a third step, the calcined mixture was ground in a ball mill with milling beads. The alumina milling beads have a diameter of about a centimetre, especially between 3 cm and 5 cm. The amount of milling beads relative to the calcined mixture was 20.

During the fourth and final step, the result after grinding was passed through a polyamide screen with a mesh size of 200 μm.

FIG. 1 shows the result obtained.

According to another test during which the calcination temperature was 1200° C. for 4 hours during the second step, alpha alumina particles with a size $d_{50}$ of 1 μm and a substantially spherical shape were obtained with good homogeneity. It was found that a lower calcination temperature with a longer residence time gives better size homogeneity of the spherical alumina particles.

2. Aluminate Luminophore

A subject of the invention is also aluminate luminophores in the form of aggregates with a mean size of about 10 μm, these aggregates being composed of particles with a mean size of between 0.25 μm and 1.5 μm. The term "mean size" generally means the diameter $d_{50}$ defined above.

These luminophores are aluminates in the form of a composition corresponding to the formulae:

$$a(M^1O).b(MgO).c(Al_2O_3) \qquad (1)$$

$$\text{or } a(M^2O_{1.5}).b(MgO).c(Al_2O_3) \qquad (2)$$

in which $M^1$ denotes at least one alkaline-earth metal, $M^2$ denotes yttrium or cerium and terbium in combination, and a, b and c are integers or non-integers that satisfy the relationships: $0.25 \leq a \leq 4$; $0 \leq b \leq 2$ and $0.5 \leq c \leq 9$; in that $M^1$ and $M^2$ are partially substituted with europium and at least one other element belonging to the group of rare-earth metals, more particularly neodymium, terbium, cerium, dysprosium and gadolinium.

The magnesium may be partially replaceable with Zn, Mn or Co, and the aluminium may be partially replaceable with Ga, Sc, B, Ge and Si.

According to another aspect of the invention, the luminophore is chosen from the group comprising $(Ce_{0.6}Tb_{0.4})MgAl_{11}O_{19}$; $(Ba_{0.9}Eu_{0.1})MgAl_{10}O_{17}$; $Y_3Al_5O_{12}:Eu^{2+}$; $Y_3Al_5O_{12}:Ce^{3+}$; $Y_2O_3:Eu^{3+}$; $SrAl_{12}O_{19}:Mn^{2+}$; $Zn_2SiO_4:Mn^{2+}$.

BAM, CAT and YOx have visible emission spectra in the blue, green and red regions, respectively, which, on mixing, makes it possible to produce trichromatic bulbs. As individual luminophores, they make it possible, for example, to produce screen pixels or emissive diodes.

For the preparation of these novel specific luminophores, three alternative preparation processes are proposed.

2.1 Preparation of an Aluminate Luminophore Via the Alum Route

According to a process for preparing an aluminate luminophore via the alum route as defined above, which is in the form of aggregates with a mean size of about 10 µm, these aggregates being composed of particles with a mean size of between 0.25 and 1.5 µm, the following operations were performed.

In a first step, ammonium alum is mixed with at least one additive based on a rare-earth metal.

The additive based on a rare-earth metal is a rare-earth metal nitrate $M^3(NO_3)_3$, $M^3$ being a rare-earth metal taken from the group formed by lanthanum, cerium, praseodymium, neodymium, promethium, samarium, europium, gadolinium, terbium, dysprosium, holmium, erbium, thulium, ytterbium, lutetium, yttrium and scandium.

As a function of the luminophore, there may be a single rare-earth metal nitrate [for example in the manufacture of BAN of $Eu(NO_3)_3$] or several [for example $Tb(NO_3)_3$ and $Ce(NO_3)_3$ for the manufacture of CAT].

According to one particular aspect for the preparation of BAM, anhydrous barium sulfate ground to $d_{50}<1$ µm is also added.

To this mixture, in particular for the manufacture of BAN and CAT, there may be reason also to add magnesium sulfate heptahydrate ($MgSO_4.7H_2O$) which is commercially available in high chemical purity. The sulfate is the salt that is compatible with ammonium alum in this process and in particular compatible with the treatment of the oven outlet gases.

In a second step, this mixture is calcined at a first temperature of between 1100° C. and 1200° C., in particular 1150° C., for a time of between 1 hour and 2 hours, in particular 1 hour 30 minutes.

In a third step, the calcined mixture is passed through a grille made of a non-contaminating material, for example plastic, especially polyamide, with a mesh size of between 150 µm and 250 µm, especially 200 µm.

In a fourth step, the calcined mixture passed through the screen is ground, for example in a ball mill with alumina milling beads at least ten times greater in amount than the calcined precursor, for between 8 hours and 30 hours.

Next, in a fifth step, the ground mixture is passed through a grille made of a non-contaminating material, for example plastic, especially polyamide, with a mesh size of between 150 µm and 250 µm, especially 200 µm.

In a sixth step, this ground mixture is calcined at a second temperature of between 1300° C. and 1400° C., in particular 1350° C., for a time of between 3 hours and 5 hours, in particular 4 hours.

In a seventh step, the result is ground, for example in a ball mill with alumina milling beads at least ten times greater in amount that the calcined precursor, for between 8 hours and 30 hours.

In an eighth step, the result is passed through a grille made of a non-contaminating material, for example plastic, especially polyamide, with a mesh size of between 150 µm and 250 µm, especially 200 µm.

According to a ninth step as a function of the type of luminophore, in particular for BAM and CAT, a final step of reduction with a gas containing hydrogen is performed, with a temperature rise of between 10° C.-20° C./minute, especially 14° C./minute, and a steady stage of at least 1 hour at a temperature of between 1500° C. and 1600° C. at a pressure of about 100 mbar.

EXAMPLE 2

Process for Preparing BAM Via the Alum Route

To obtain about 1 kg of BAM: EU $(Ba_{0.9}Eu_{0.1})MgAl_{10}O_{17}$, the following are mixed together in a first step:
 5833 g of ammonium alum,
 270 g of anhydrous barium sulfate ($BaSO_4$) ground to $d_{50}<1$ µ,
 308 g of magnesium sulfate heptahydrate ($MgSO_4.7H_2O$), and
 106.8 ml of a europium nitrate solution ($Eu(NO_3)_3$) at 233 g of oxide/l.

In a second step, this mixture is calcined at a first temperature of 1150° C. for a time of 1 hour 30 minutes.

In a third step, this calcined mixture is passed through a grille made of polyamide plastic with a mesh size of 200 µm.

In a fourth step, the calcined mixture passed through the screen is ground in a ball mill with alumina milling beads in an amount twenty times greater than the calcined result, for 8 hours.

In a fifth step, the ground mixture is passed through a grille made of plastic, especially of polyamide, with a mesh size of between 150 µm and 250 µm, especially 200 µm.

In a sixth step, this ground and screened mixture is calcined at a second temperature of 1350° C. for a time of 4 hours.

In a seventh step, the result obtained is ground in a ball mill with milling beads in an amount twenty times greater than the calcined result, for 8 hours.

In an eighth step, the ground mixture is passed through a grille made of plastic, especially of polyamide, with a mesh size of between 150 µm and 250 µm, especially 200 µm.

In an ninth step, a final step of reduction is performed with a gas containing hydrogen, for example a mixture (95% $N_2$ and 5% $H_2$) with a temperature rise of 14° C./minute, and a steady stage of at least 1 hour at a temperature of 1600° C. at a pressure of about 100 mbar.

EXAMPLE 3

Process for Preparing CAT Via the Alum Route

To obtain about 1 kg of CAT $(Ce_{0.6}Tb_{0.4})MgAl_{11}O_{19}$, the following are mixed together in a first step:
 6400 g of ammonium alum containing 11.25% oxide,
 335.64 g of crystalline $Ce(NO_3)_3$ containing 39.5% oxide,
 423.22 g of a $Tb(NO_3)_3$ solution containing 22.68% oxide,
 315.55 g of crystalline $MgSO_4.7H_2O$ containing 16.4% oxide.

In a second step, this mixture is calcined at a first temperature of 1150° C. for a time of 1 hour 30 minutes (see the diffraction spectrum of FIG. 3: CAT precursor 1150° C.)

In a third step, this calcined mixture is passed through a grille made of polyamide plastic with a mesh size of 200 µm.

In a fourth step, the calcined mixture passed through the screen is ground with alumina milling beads in an amount twenty times greater than the calcined result, for 8 hours.

In a fifth step, the ground mixture is passed through a grille made of plastic, especially of polyamide, with a mesh size of between 150 µm and 250 µm, especially 200 µm.

In a sixth step, this ground and screened mixture is calcined at a second temperature of 1350° C. for a time of 4 hours (see the diffraction spectrum of FIG. 3: calcined CAT 1350° C.)

In a seventh step, the result obtained is ground in a ball mill with alumina milling beads in an amount twenty times greater than the calcined result, for 8 hours.

In an eighth step, the ground mixture is passed through a grille made of plastic, especially of polyamide, with a mesh size of between 150 μm and 250 μm, especially 200 μm.

In a ninth step, a final step of reduction is performed with a gas containing hydrogen, for example a mixture (95% $N_2$ and 5% $H_2$) with a temperature rise of 14° C./minute, and a steady stage of at least 1 hour at a temperature of 1600° C. at a pressure of about 100 mbar (see the diffraction spectrum of FIG. 3: reduced CAT).

The diffraction spectrum of the reduced product does not show any crystalline species other than the CAT luminophore.

EXAMPLE 4

Process for Preparing YAG Via the Alum Route

To obtain about 1 kg of YAG:Ce, i.e. $Y_3Al_5O_{12}:Ce^{3+}$, the following are mixed together in a first step:
3833 g of ammonium alum,
570 g of an yttrium nitrate solution $Y(NO_3)_3$ at 359 g/l,
4.4 g of a cerium nitrate solution $Ce(NO_3)_3$ at 19.2%.

In a second step, this mixture was calcined at a first temperature of 1150° C. for a time of 1 hour 30 minutes (see the diffraction spectrum of FIG. 4: YAG precursor 1150° C.)

In a third step, this calcined mixture was passed through a polyamide plastic grille with a mesh size of 200 μm.

In a fourth step, the calcined mixture passed through the screen was ground in a ball mill with alumina milling beads in an amount twenty times greater than the calcined result, for 8 hours.

In a fifth step, the ground mixture is passed through a grille made of plastic, especially of polyamide, with a mesh size of between 150 μm and 250 μm, especially 200 μm.

In a sixth step, this ground and screened mixture is calcined at a second temperature of 1350° C. for a time of 4 hours (see the diffraction spectrum of FIG. 3: calcined YAG 1350° C.)

In a seventh step, the result obtained was ground in a ball mill with alumina milling beads in an amount twenty times greater than the calcined result, for 8 hours.

In an eighth step, the ground mixture was passed through a grille made of plastic, especially of polyamide, with a mesh size of between 150 μm and 250 μm, especially 200 μm.

The diffraction spectrum does not reveal any crystalline species other than the YAG luminophore.

It will be noted that, according to the same process, YAGs doped with $Eu^{3+}$, $Tb^{4+}$ or $Gd^{3+}$, and mixtures of the last two dopants, may be produced. It will be noted that, according to the same process, YAGs doped with $Ni^{2+}$, $V^{2+}$, $Co^{2+}$, which require a final reduction step according to the protocol defined previously, may be produced.

More generally, the YAGs may be doped to between 0.1% and 5% with cations of transition elements, in their oxidized or reduced form. The alum route is particularly suitable for incorporating them into the cubic lattice of YAG.

2.2. Preparation Via the Impregnation Route of a Gamma Alumina of an Aluminate Luminophore As an alternative to the alum route, a process is proposed for the preparation via the impregnation route of an aluminate luminophore as defined above in the form of aggregates with a mean size of about 10 μm, these aggregates being composed of particles with a mean size of between 0.25 and 1.5 μm.

In a first step of this process, gamma alumina heated with a first solution of barium and magnesium alkaline-earth metal salts, heated to between 80° C. and 95° C. and especially 90° C., is impregnated a first time with at least one additive based on a rare-earth metal.

The additive based on a rare-earth metal is a rare-earth metal nitrate $M^3(NO_3)_3$, $M^3$ being a rare-earth metal alone or a mixture taken from the group formed by lanthanum, cerium, praseodymium, neodymium, promethium, samarium, europium, gadolinium, terbium, dysprosium, holmium, erbium, thulium, ytterbium, lutetium, yttrium and scandium.

For the preparation of the BAM, the impregnation solution comprises, besides the additive based on a rare-earth metal, magnesium sulfate and barium nitrate.

For the preparation of the CAT, besides the additive based on a rare-earth metal, magnesium sulfate is added to the mixture of the ammonium alum-impregnation solution.

This impregnation is found to be improved when the alumina is preheated to a temperature of between 80° C. and 150° C., especially 120° C., for a time of between 10 minutes and 2 hours.

In a second step, the impregnated gamma alumina is subjected to a first denitration heat treatment by heating to a first temperature of between 500° C. and 700° C., in particular 600° C., for a time of between 2 hours and 4 hours, in particular 3 hours.

In a third step, the impregnated and denitrated alumina is passed through a grille made of a non-contaminating material, for example plastic, especially polyamide, with a mesh size 500 μm. This step makes it possible to avoid any residual crucible bits that it is not desired to entrain into the following grinding step.

In a fourth step, the result is ground, for example in a ball mill with alumina milling beads at least ten times greater in amount than the impregnated and denitrated alumina, for between 8 hours and 30 hours.

In a fifth step, this ground mixture is calcined at a temperature of between 1300° C. and 1400° C., in particular 1350° C., for a time of between 3 hours and 5 hours, in particular 4 hours.

In a sixth step, the result is ground, for example in a ball mill with alumina milling beads at least ten times greater in amount than the calcined precursor, for between 8 hours and 30 hours.

In a seventh step, the result is passed through a grille made of a non-contaminating material, for example plastic, especially polyamide, with a screen size of between 150 μm and 250 μm, especially 200 μm.

In an eighth step, as a function of the type of luminophore (for example for BAN and CAT), a final reduction step is performed with a gas containing hydrogen, with a temperature rise of between 10° C.-20° C./minute, especially 14° C./minute, and a steady stage of at least 1 hour at a temperature of between 1500° C. and 1600° C. at a pressure of about 100 mbar.

In particular for BAN, it found to be judicious to add a second impregnation.

Consequently, after the first impregnation and the first denitration treatment, the following steps may be inserted, consisting in:
impregnating a second time the impregnated and denitrated alumina in a second solution heated to between 80° C. and 95° C., especially 90° C., with at least one additive based on a rare-earth metal,
subjecting the impregnated gamma alumina to a second denitration heat treatment by heating to a first temperature of between 500° C. and 700° C., in particular 600° C., for a time of between 2 hours and 4 hours, in particular 3 hours.

EXAMPLE 5

Process for Preparing BAM Via the Gamma Alumina Impregnation Route

To obtain about 1 kg of BAM, in a first step of this process, 750 g of gamma alumina (commercially available as Baikalox® B105 with a 100% gamma crystal structure and a mean size $d_{50}$ of about 6 μm) heated to 120° C. were impregnated a first time with 1825 ml of a solution heated to 90° C., containing:

- 205.3 g of barium nitrate containing 59.3% oxide,
- 254.16 g of magnesium nitrate hexahydrate containing 14% oxide, and
- 39.42 g of europium nitrate containing 39.4% oxide.

Next, in a second step, the impregnated gamma alumina is subjected to a first denitration heat treatment by heating to a first temperature of 600° C. for a time of 3 hours.

In a third step, the impregnated and denitrated alumina is impregnated a second time with 1125 ml of a solution heated to 90° C., containing:

- 136.9 g of barium nitrate containing 59.3% oxide,
- 169.44 g of magnesium nitrate hexahydrate containing 14% oxide, and
- 26.28 g of europium nitrate containing 39.4% oxide.

In a fourth step, the impregnated gamma alumina is subjected to a second denitration heat treatment by heating at a first temperature of 600° C. for a time of 3 hours (see the diffraction spectrum of FIG. 2, precursor BAM 600° C.)

In a fifth step, the result is ground in a ball mill with alumina milling beads in an amount twenty times greater than the calcined result, for 16 hours.

In a sixth step, the ground mixture is passed through a grille made of plastic, especially of polyamide, with a mesh size of between 150 μm and 250 μm, especially 200 μm.

In a seventh step, this ground mixture is calcined at a temperature of 1350° C. for a time of 3 hours (see the diffraction spectrum of FIG. 2, BAN calcined 1350° C.)

In an eighth step, the result is ground in a ball mill with alumina milling beads in an amount twenty times greater than the calcined result, for 16 hours.

In a ninth step, the result is passed through a grille made of plastic, especially of polyamide, with a mesh size of between 150 μm and 250 μm, especially 200 μm.

In a tenth step, a final reduction step is performed with a gas containing hydrogen, with a temperature rise of between 10° C.-20° C./minute, especially 14° C./minute, and a steady stage of at least 1 hour at a temperature of between 1500° C. and 1600° C. at a pressure of about 100 mbar (see the diffraction spectrum of FIG. 2, reduced BAN).

EXAMPLE 6

Process for Preparing CAT Via the Gamma Alumina Impregnation Route

To obtain about 1 kg of CAT, in a first step of this process, 720 g of gamma alumina (commercially available as Baikalox® B105 and having a 100% gamma crystal structure and a mean size $d_{50}$ of about 6 μm) were impregnated with a solution of:

- 360 ml of a $Ce(NO_3)_3$ solution containing 368.3 g/l of oxide,
- 258 ml of a $Tb(NO_3)_3$ solution containing 372 g/l of oxide,
- 576 ml of an $MgSO_4$ solution containing 89.8 g/l of oxide.

Next, in a second step, the impregnated gamma alumina is subjected to a first denitration heat treatment by heating at a first temperature of 600° C. for a time of 3 hours.

In a third step, the result is ground in a ball mill with alumina milling beads in an amount twenty times greater than the calcined result, for 16 hours.

In a fourth step, the ground mixture is passed through a grille made of plastic, especially of polyamide, with a mesh size of between 150 μm and 250 μm, especially 200 μm.

In a fifth step, this ground mixture is calcined at a temperature of 1350° C. for a time of 3 hours (see the diffraction spectrum of FIG. 2, BAM calcined 1350° C.)

In a sixth step, the result is ground in a ball mill with alumina milling beads in an amount twenty times greater than the calcined result, for 16 hours.

In a seventh step, the ground result is passed through a grille made of plastic, especially of polyamide, with a mesh size of between 150 μm and 250 μm, especially 200 μm.

In an eighth step, a final reduction step is performed with a gas containing hydrogen, with a temperature rise of between 10° C.-20° C./minute, especially 14° C./minute, and a steady stage of at least 1 hour at a temperature of between 1500° C. and 1600° C. at a pressure of about 100 mbar (see the diffraction spectrum of FIG. 2, reduced BAM).

2.3 Preparation Via the Impregnation Route of an Alumina Spinel of an Aluminate Luminophore:

As a variant, a process is also proposed for the preparation via the impregnation route of an alumina spinel of an aluminate luminophore as defined above in the form of aggregates with a mean size of about 10 μm, these aggregates being composed of particles with a mean size of between 0.25 and 1.5 μm. This process comprises the following operations:

According to a first step, an alumina spinel heated with a first solution heated to between 80° C. and 95° C., especially 90° C., is impregnated with at least one additive based on a rare-earth metal.

Such alumina spinels have been described in document U.S. Pat. No. 6,251,150.

It proves to be judicious for the alumina spinel to be heated beforehand at a temperature of between 80° C. and 150° C., especially 120° C., for a time of between 10 minutes and 2 hours.

The additive based on a rare-earth metal is, for example, a rare-earth metal nitrate $M^3(NO_3)_3$, $M^3$ being a rare-earth metal alone or as a mixture taken from the group formed by lanthanum, cerium, praseodymium, neodymium, promethium, samarium, europium, gadolinium, terbium, dysprosium, holmium, erbium, thulium, ytterbium, lutetium, yttrium and scandium.

For the preparation of BAM, barium nitrate is added to the impregnation solution of the alumina spinel containing the additive based on a rare-earth metal.

According to a second step, the impregnated alumina spinel is dried at a temperature of between 100° C. and 150° C., especially 120° C., for a time of between 3 hours and 5 hours, especially 4 hours.

Next, according to a third step, the dried result is passed through a grille made of a non-contaminating material, for example of plastic, especially of polyamide, with a mesh size ≤500 μm.

According to a fourth step, the impregnated alumina spinel is subjected to denitration heat treatment by heating at a first temperature of between 500° C. and 700° C., in particular 600° C., for a time of between 2 hours and 4 hours, in particular 3 hours.

According to a fifth step, the impregnated and denitrated alumina spinel is ground, for example in a ball mill with alumina milling beads at least ten times greater in amount than the calcined precursor, for between 8 hours and 30 hours.

According to a sixth step, the ground result is passed through a grille made of a non-contaminating material, for example of plastic, especially of polyamide, with a mesh size of between 150 µm and 250 µm, especially 200 µm.

According to a seventh step, this ground and screened mixture is calcined at a temperature of between 1300° C. and 1400° C., in particular 1350° C., for a time of between 3 hours and 5 hours, in particular 4 hours.

According to an eighth step, the result is ground, for example in a ball mill with alumina milling beads at least ten times greater in amount than the calcined precursor, for between 8 hours and 30 hours, in particular 16 hours.

According to a ninth step, the ground result is passed through a grille made of plastic, especially of polyamide, with a mesh size of between 150 µm and 250 µm, especially 200 µm.

According to yet another aspect, as a function of the luminophore, a final tenth step of reduction with a gas containing hydrogen is added, with a temperature rise of between 10° C.-20° C./minute, especially 14° C./minute, and a steady stage of at least 1 hour at a temperature of between 1500° C. and 1600° C. at a pressure of about 100 mbar.

EXAMPLE 7

Process for Preparing BAM Via the Alumina Spinel Impregnation Route

To obtain about 1 kg of BAN, according to a first step, 750 g of alumina spinel ($5Al_2O_3.MgO$) preheated to a temperature of 120° C. were impregnated with 1.66 litres of a solution heated to 90° C., containing:
  320.75 g of barium nitrate containing 59.3% oxide, and
  98 ml of a europium nitrate solution containing 247.4 g of oxide/l.

Such alumina spinels have been described in document U.S. Pat. No. 6,251,150, but may also be obtained by mixing, while respecting the proportions, 7000 g of ammonium alum and 376.7 g of $Mg(SO_4).7H_2O$ and by calcining this mixture at a temperature of between 1100° C. and 1200° C., especially 1150° C., for a time of between 1 hour and 2 hours, especially 1 hour 30 minutes.

According to a second step, the impregnated alumina spinel was dried at a temperature of 120° C. for a time of 4 hours.

Next, according to a third step, the dried result was passed through a grille made of plastic, especially of polyamide, with a mesh size ≤500 µm.

According to a fourth step, the impregnated alumina spinel was subjected to a denitration heat treatment by heating at a first temperature of 600° C. for a time of 3 hours.

According to a fifth step, the impregnated and denitrated alumina spinel was ground in a ball mill with alumina milling beads in an amount twenty times greater than the result, for 16 hours.

According to a sixth step, the ground result was passed through a grille made of plastic, especially of polyamide, with a mesh size of 200 µm.

According to a seventh step, this ground and screened mixture was calcined at a temperature of 1350° C., for a time of 4 hours.

According to an eighth step, the result was ground in a ball mill with alumina milling beads in an amount twenty times greater than the result, for 16 hours.

According to a ninth step, the ground result was passed through a grille made of plastic, especially of polyamide, with a mesh size of 200 µm.

According to a final tenth step, the result was reduced with a gas composed of 95% $N_2$ and 5% $H_2$, with a temperature rise of 14° C./minute and a steady stage of one hour at a temperature of 1600° C. at a pressure of about 100 mbar.

The luminophores as defined above may be used in the manufacture of display screens, lighting (fluorescent lamps), projectors, in particular plasma screens or field-emission screens, backlight lamps for liquid-crystal screens, light-emitting diodes, plasma-excitation light bulbs and trichromatic bulbs.

3. Alumina-Luminophore Mixed Compound

In particular for the manufacture of monolayer fluorescent lamps, an alumina-luminophore mixed compound is proposed, comprising between 50% and 95% of alpha alumina with a size $d_{50}$ of between 0.3 µm and 2 µm and a spherical shape as defined above, and between 5% and 50% of a luminophore.

The luminophore is an aluminate in the form of a composition corresponding to the formula:

$$a(M^1O).b(MgO).c(Al_2O_3) \quad (1)$$

$$\text{or } a(M^2O_{1.5}).b(MgO).c(Al_2O_3) \quad (2)$$

in which $M^1$ denotes at least one alkaline-earth metal, $M^2$ denotes yttrium or cerium and terbium in combination, and a, b and c are integers or non-integers that satisfy the relationships: $0.25 \leq a \leq 4$; $0 \leq b \leq 2$ and $0.5 \leq c \leq 9$; in that $M^1$ and $M^2$ are partially substituted with europium and at least one other element belonging to the group of rare-earth metals, more particularly neodymium, terbium, cerium, dysprosium and gadolinium. The magnesium may be partially replaceable with Zn, Mn or Co, and the aluminium may be partially replaceable with Ga, Sc, B, Ge and Si.

According to another aspect of the invention, the luminophore is chosen from the group comprising ($Ce_{0.6}Tb_{0.4}$)$MgAl_{11}O_{19}$; ($Ba_{0.9}Eu_{0.1}$)$MgAl_{10}O_{17}$; $Y_3Al_5O_{12}$:$Eu^{2+}$; $Y_3Al_5O_{12}$:$Ce^{3+}$; $Y_2O_3$:$Eu^{3+}$; $SrAl_{12}O_{19}$: $Mn^{2+}$; $Zn_2SiO_4$: $Mn^{2+}$.

As luminophore, it is possible to use commercial luminophores and this mixed compound has a reduced cost for equivalent performance qualities as a result of its composition. This is possible by virtue of the better reflection properties of the alpha alumina particles.

It is even more preferable to use a luminophore as defined above in points 2, 2.1, 2.2 and 2.3.

This mixed compound may be prepared via a preparation process in which:
  between 50% and 95% of alpha alumina composed essentially of particles with a size $d_{50}$ of between 0.3 µm and 2 µm and a substantially spherical shape and between 5% and 50% of a luminophore are mixed together,
  the mixture is ground, for example in a ball mill with alumina milling beads at least ten times greater in amount than the mixture, for between 8 hours and 30 hours,
  the ground result is passed through a grille made of a non-contaminating material, for example of plastic, especially of polyamide, with a mesh size of between 150 µm and 250 µm, especially 200 µm.

According to one variant, milling of air-jet type may be envisaged, for example with an "Alpine"-type plate air-jet mill.

A subject of the invention is also the use of the mixed compound as defined above in the manufacture of display screens, lighting, projectors, in particular plasma screens or field-emission screens, backlight lamps for liquid-crystal screens, light-emitting diodes, plasma-excitation light bulbs and trichromatic bulbs.

A subject of the invention is also an aqueous suspension for producing a coating for fluorescent lamps, especially fluorescent tubes comprising at least one mixed compound as defined above, polyethylene oxide, gamma alumina obtained from the alum route and demineralized water.

The weight proportions in the aqueous solution are:
25% to 50% of at least one mixed compound as defined above,
0.5% to 5% of polyethylene oxide,
0.3% to 1.5% of gamma alumina obtained from the alum route,
and the remainder being demineralized water.

This aqueous solution may comprise three different mixed compounds forming a trichromatic assembly.

For example, the three mixed compounds may be present in weight proportions of:
between 35% and 40%, preferably 38%, of mixed compound $(Ce_{0.6}Tb_{0.4})MgAl_{11}O_{19}$-alpha alumina composed essentially of particles with a size $d_{50}$ of between 0.3 μm and 2 μm and a spherical shape;
between 10% and 15%, preferably 12%, of mixed compound $(Ba_{0.9}Eu_{0.1})MgAl_{10}O_{17}$-alpha alumina composed essentially of particles with a size $d_{50}$ of between 0.3 μm and 2 μm and a spherical shape;
and the remainder being the mixed compound $Y_2O_3$:$Eu^{3+}$-alpha alumina composed essentially of particles with a size $d_{50}$ of between 0.3 μm and 2 μm and a spherical shape.

The invention claimed is:

1. A process for preparing an alpha alumina comprised essentially of particles with a size $d_{50}$ of between 0.3 μm and 2 μm and a substantially spherical shape, the process comprising the following operations:
mixing gamma alumina obtained via the alum route with a sintering agent and alpha alumina seeds,
calcining the mixture in an oven at a temperature of between 1150° C. and 1400° C., for a time of between 1 hour and 6 hours,
grinding the calcined mixture, and
passing the ground calcined mixture through a grille made of non-contaminating material with a mesh size of between 150 μm and 250 μm.

2. A process according to claim 1, wherein said sintering agent is $NH_4F$.

3. A process according to claim 2, wherein said mixture is composed, in weight proportions, of about 85% to about 95% gamma alumina obtained via the alum route, of about 2.5% to about 13% alpha alumina and of about 0.4% to about 1.8% $NH_4F$.

4. A process according to claim 3, wherein said mixture is composed, in weight proportions, of about 93.5% gamma alumina obtained via the alum route, of about 5.5% alpha alumina and of about 1% $NH_4F$.

5. A process according to claim 1, wherein said calcined mixture is ground in a ball mill with alumina milling beads at least twenty times greater in amount than the calcined mixture, for 16 hours.

6. A process according to claim 5 in which said alumina milling beads have a diameter in the range of about one centimeter to about five centimeters.

* * * * *